(12) United States Patent
Geagan, III et al.

(10) Patent No.: US 9,066,082 B2
(45) Date of Patent: Jun. 23, 2015

(54) FORENSICS IN MULTI-CHANNEL MEDIA CONTENT

(71) Applicant: International Business Machines Corporation, Armonk, NY (US)

(72) Inventors: John Bernard Geagan, III, San Jose, CA (US); Dulce B. Ponceleon, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 13/842,715

(22) Filed: Mar. 15, 2013

(65) Prior Publication Data

US 2014/0270168 A1 Sep. 18, 2014

(51) Int. Cl.
*H04N 21/4405* (2011.01)
*H04N 7/167* (2011.01)
(Continued)

(52) U.S. Cl.
CPC ......... *H04N 19/00769* (2013.01); *H04N 7/167* (2013.01); *H04L 2209/606* (2013.01); *G11B 20/00086* (2013.01); *G11B 20/00173* (2013.01); *H04N 19/00569* (2013.01);
(Continued)

(58) Field of Classification Search
CPC .............. H04N 19/00769; H04N 19/00569; H04N 19/167; H04N 13/0048; H04N 13/0055; H04N 21/44055; H04N 2013/0085; H04N 21/23476; H04N 2005/91342; H04N 19/187; H04N 19/11; H04N 19/30; H04N 19/597; H04N 7/167; G11B 20/00086; G11B 20/00173; H04L 2209/606; H04L 63/0428; G10L 19/008

USPC .............................. 726/32; 713/176; 380/210
See application file for complete search history.

(56) References Cited

U.S. PATENT DOCUMENTS 5,619,256 A * 4/1997 Haskell et al. .................. 348/43
5,633,682 A * 5/1997 Tahara ..................... 375/240.23
(Continued)

FOREIGN PATENT DOCUMENTS

JP 2000172877 A 6/2000
JP 02004127208 A 4/2004

OTHER PUBLICATIONS

Lotspiech, J., The advanced access content system's use of digital watermarking, Oct. 2006.
(Continued)

*Primary Examiner* — Michael Simitoski
(74) *Attorney, Agent, or Firm* — Fleit Gibbon Gutman Bongini & Bianco PL; Thomas Grzesik (57) ABSTRACT

Embodiments of the invention relate to encoding multi-channel media content. In one embodiment, a set of multi-channel media content is received. The set of multi-channel media content includes a plurality of content frames. Each content frame includes a first channel content frame and second channel content frame. Each of the first channel content frames is grouped into a first group of content frames. Each of the second channel content frames is grouped into a second group of content frames. Each content frame in the first group of content frames is encoded. At least a first content frame in the first group of content frames includes at least one variation, where the variation is a different version of the first content frame. Each content frame in the second group of content frames is also encoded, where the second group of content frames is absent any content frames including a variation.

23 Claims, 8 Drawing Sheets

(51) Int. Cl.
*H04N 19/597* (2014.01)
*G11B 20/00* (2006.01)
*H04N 19/50* (2014.01)
*H04N 19/167* (2014.01)
*H04N 19/30* (2014.01)
*H04N 19/11* (2014.01)
*H04N 19/109* (2014.01)
*H04N 19/157* (2014.01)
*H04N 19/187* (2014.01)
*G06F 12/14* (2006.01)

(52) U.S. Cl.
CPC ........ *H04N 19/167* (2014.11); *H04N 21/4405* (2013.01); *H04N 19/597* (2014.11); *H04N 19/30* (2014.11); *H04N 19/11* (2014.11); *H04N 19/109* (2014.11); *H04N 19/157* (2014.11); *H04N 19/187* (2014.11)

(56) References Cited

U.S. PATENT DOCUMENTS

| | | | | |
|---|---|---|---|---|
| 5,963,909 | A * | 10/1999 | Warren et al. | 705/52 |
| 7,295,673 | B2 * | 11/2007 | Grab et al. | 380/239 |
| 8,693,687 | B2 * | 4/2014 | Wen | 380/258 |
| 2004/0064702 | A1 | 4/2004 | Yu et al. | |
| 2004/0111611 | A1 * | 6/2004 | Jin et al. | 713/163 |
| 2004/0252186 | A1 * | 12/2004 | Mashitani et al. | 348/51 |
| 2009/0074242 | A1 | 3/2009 | Yamamoto et al. | |
| 2010/0037059 | A1 | 2/2010 | Sun et al. | |
| 2010/0067692 | A1 | 3/2010 | Schultz et al. | |
| 2010/0098250 | A1 | 4/2010 | Schultz et al. | |
| 2010/0135488 | A1 * | 6/2010 | Lee et al. | 380/200 |
| 2011/0064262 | A1 | 3/2011 | Chen et al. | |
| 2011/0134227 | A1 * | 6/2011 | Shin | 348/54 |
| 2011/0164121 | A1 * | 7/2011 | Ikeda et al. | 348/51 |
| 2011/0176616 | A1 * | 7/2011 | Luthra et al. | 375/240.16 |
| 2011/0280552 | A1 * | 11/2011 | Ikeuchi et al. | 386/343 |
| 2011/0286531 | A1 * | 11/2011 | Okajima | 375/240.25 |
| 2012/0066709 | A1 * | 3/2012 | Ahn | 725/31 |
| 2012/0082309 | A1 * | 4/2012 | Wen | 380/200 |
| 2012/0331509 | A1 * | 12/2012 | Laksono | 725/56 |
| 2013/0051564 | A1 * | 2/2013 | Baum et al. | 381/19 |
| 2013/0287090 | A1 * | 10/2013 | Sasaki et al. | 375/240.01 |
| 2014/0105392 | A1 * | 4/2014 | Robert et al. | 380/210 |

OTHER PUBLICATIONS

Yu, Z. et al., A robust watermarking scheme for 3D triangular mesh models, Pattern Recogntion, Feb. 2003.

Garcia, E. et al., Texture-based watermarking of 3D video objects, Aug. 2003.

IBM, Traitor tracing for Pre-recorded DVDs, Aug. 2009.

* cited by examiner

FORENSICS IN MULTI-CHANNEL MEDIA CONTENT

BACKGROUND

The present invention generally relates to video encoding, and more particularly relates to forensic variations within multi-channel media content.

Protection of distributed media content, such as motion pictures, has been an important goal of content owners for many years. One method of preventing and detecting unauthorized copying of media content is to include variations of the same content section. For a given player, during the decoding process, only one of the variations is decoded for playback. Therefore, when the content is copied, the copy includes only one encoded variation. This single variation within the copied content generally makes the copied content traceable.

BRIEF SUMMARY

In one embodiment a method is disclosed. The method comprises receiving a set of multi-channel media content. The set of multi-channel media content comprises a plurality of content frames. Each content frame in the plurality of content frames comprises a first channel content frame and second channel content frame. Each of the first channel content frames in the plurality of content frames is grouped into a first group of content frames. Each of the second channel content frames in the plurality of content frames is grouped into a second group of content frames. Each content frame in the first group of content frames is encoded. At least a first content frame in the first group of content frames that has been encoded comprises at least one variation, where the variation is a different version of the first content frame. Each content frame in the second group of content frames is also encoded, where the second group of content frames that has been encoded is absent any content frames comprising a variation.

In another embodiment, a system is disclosed. The information processing system comprises a memory and a processor that is communicatively coupled to the memory. An encoding system is communicatively coupled to the memory and the processor. The encoding system is configured to perform a method. The method comprises receiving a set of multi-channel media content. The set of multi-channel media content comprises a plurality of content frames. Each content frame in the plurality of content frames comprises a first channel content frame and second channel content frame. Each of the first channel content frames in the plurality of content frames is grouped into a first group of content frames. Each of the second channel content frames in the plurality of content frames is grouped into a second group of content frames. Each content frame in the first group of content frames is encoded. At least a first content frame in the first group of content frames that has been encoded comprises at least one variation, where the variation is a different version of the first content frame. Each content frame in the second group of content frames is also encoded, where the second group of content frames that has been encoded is absent any content frames comprising a variation.

In a further embodiment, a computer program product is disclosed. The computer readable storage medium has program code embodied therewith. The program code is readable/executable by a processor to perform a method. The method comprises receiving a set of multi-channel media content. The set of multi-channel media content comprises a plurality of content frames. Each content frame in the plurality of content frames comprises a first channel content frame and second channel content frame. Each of the first channel content frames in the plurality of content frames is grouped into a first group of content frames. Each of the second channel content frames in the plurality of content frames is grouped into a second group of content frames. Each content frame in the first group of content frames is encoded. At least a first content frame in the first group of content frames that has been encoded comprises at least one variation, where the variation is a different version of the first content frame. Each content frame in the second group of content frames is also encoded, where the second group of content frames that has been encoded is absent any content frames comprising a variation.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
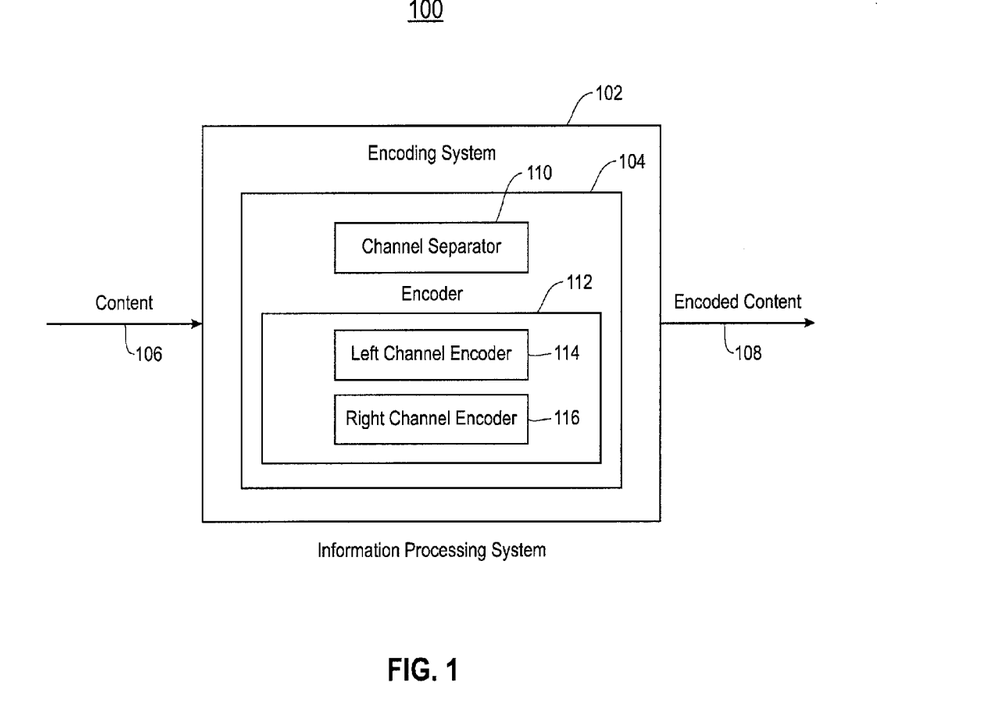
FIG. 1 is a block diagram illustrating one example of an operating environment according to one embodiment of the present invention.

FIG. 1 shows one example of an operating environment 100 applicable to various embodiments of the present invention. In one embodiment, one or more information processing systems 102 comprise an encoding system 104. The encoding system 104 receives content 106 and performs one or more encoding operations therein to generate encoded content 108. The content 106, in one embodiment, is any multi-channel media content such as, multi-channel audio, multi-channel video, etc. The content 106 can be received over a network (not shown) and/or loaded onto the information processing system 102 from a computer readable storage medium such as, but not limited to, an optical disk, magnetic storage device, a solid state storage device, and the like.

The encoding system 104, in one embodiment, comprises a channel separator 110, an encoder 112. An optional combiner (not shown) can be included within the encoding system 104 to combine encoded L-channel image frames and encoded R-channel image frames back into a single image. In one embodiment, the encoder 112 comprises a left-channel (L-channel) encoder 114 and a right-channel (R-channel) encoder 116. However, in another embodiment a single encoder is utilized for encoding both the L-channel and the R-channel. The encoding system 104 and each of its components are discussed in greater detail below.

It should be noted that the following discussion uses 3D video content (a composite of a right-channel and a left-channel) as one example of content applicable to various embodiments of the present invention. However, any multi-channel media content where deltas or differences from other channels can be defined is also applicable. For example, one of the channels of the multi-channel media content can be identified as the primary channel to behave as the left-channel discussed herein. Also, one or more embodiments are also applicable to any bidirectional compensation scheme that uses 'deltas' or 'differences' to update/reconstruct an image/frame. Even further, embodiments of the present invention are not limited to video, and are also applicable to multi-channel audio frames or any media frames that use frame differencing for reconstruction.

Content playback devices such as DVD players utilize one or more decoders to decode/decrypt video content for playback. 2D video content usually comprises one or more variations of a given section of the content. A variation is an image or a frame that has multiple versions. For example, in a scene having a crowd of people one individual in the crowd may be wearing a different color shirt based on the variation of that scene currently being played. Variations can be conceptually similar, but programmatically different. These variations help identify individuals who are making unauthorized copies of the content since the copy will not include all the variations, but will instead include only one, i.e. the version of the scene that was decoded at copy time. Therefore, the presence of variations in content makes the content traceable.

Typically, each variation is generally encrypted with a different key. Each of these different keys are different from each other and are also different from the primary key that is used to encrypt the remaining content. It should be noted that other scheme mappings or combinations are possible as well. This use of multiple keys can be problematic for 3D video content. For example, 3D video content comprises a 2D left-channel and a 2D right-channel corresponding to the left-eye and right-eye of the viewer, respectively. When a 2D left-eye image frame and a 2D right-eye image frame are displayed together within a single frame the viewer perceives these separate images a single 3D image.

Many current 3D capable playback devices utilize two separate decoders, one for the L-channel and one for the R-channel. In many instances, one of these decoders only supports a single key such as a primary encryption key. This single-key decoder is not able to properly decode a variation, which has been encoded using a non-primary encryption key (i.e., a key that is not supported by the decoder). Therefore, many conventional methods of encoding or authoring 3D content do not provide variations within the content. Without variations, forensic operations usually cannot be performed on content to determine the source of the unauthorized copy, the source of the unauthorized copy, the compromised security keys, etc.

However, the encoding system 104, in one embodiment, encodes 3D content in such a way that forensic variations can be included within 3D content and still be decoded by a single-key decoder. For example, the encoding system 104 encodes the 3D content 106 such that variations are included within the L-channel and not in the R-channel, or vice-versa. Therefore, a single-key decoder is able to decode the channel without the variations while the multi-key decoder is able to decode the channel comprising the variations. This allows for, among other things, 3D content to include variations and be properly decoded by multi-decoder systems utilizing a combination of multi-key and single key decoders. It should be noted that even though in the following discussion the L-channel is encoded with variations and the R-channel is encoded without any variations, other embodiments can encode the L-channel without variations and encode the R-channel with variations. In either embodiment, a multi-key decoder decodes the channel comprising frames encoded within multiple keys, whereas a single-key decoder decodes the channel that does not include any variations and includes frames encoded with a single key.

In one embodiment, the encoding system 104 receives the 3D video content 106, which comprises a plurality of image frames. Each of the image frames comprises a 2D left-eye image and a corresponding 2D right-eye image. The channel separator 110 separates each frame of the received content 106 into 2D left-eye image frame and a 2D right-eye image frame. The 2D left-eye image frames are grouped into a first group of image frames representing an L-channel video stream/track and the 2D right-eye image frames are grouped into a second group of image frames representing an R-channel video stream/track.

The encoder 112 encodes the first group of image frames, via the L-channel encoder 114, and the second group of image frames, via the R-channel encoder 116. In one embodiment, the encoding process is based on Motion Compensation and Motion Estimation. Motion Compensation describes an image with respect the transformation of a reference image to the current image. The reference image can be a previous image or an image that is subsequent to the current image. Motion Estimation determines motion vectors describing the transformation from one 2D image to another 2D image such as an image in an adjacent frame. In one embodiment, each image within the L-Channel and R-channel are grouped into macroblocks, which comprise blocks of pixels. In this embodiment, the motion is compensated based on a location of the macroblock of the currently encoded image frame and a location of the previous or subsequent macroblock that has been referenced. However, any approach representing motion compensation between images by 'deltas', or any compensation scheme that captures the differences in images by a 'delta image' that is feed to the system at reconstruction time is also applicable as well.

A Discrete Cosine Transform (DCT) can be performed to convert pixel values of the 2D plane to 2D frequency information for use during the encoding process. The encoding system 104 then encodes the 2D left-eye image frames and 2D right-eye image frames through a quantization process. This encoding process encodes each frame into an I-frame using a first frame encoding type, a P-frame using a second frame encoding type, or a B-frame using a third frame encoding type. An I-frame is a key frame that is the first frame constituting a frame group (GOP). An I-frame retains most of the information that is relevant to a scene for displaying an acceptable quality image. A P-frame is a future unidirectional predicative frame that only stores a difference with a previous decompressed image. A B-frame is a bidirectional predicative frame that refers to both a preceding decompressed image and image information of a following frame.

The L-channel encoder 114 generates I-frames, P-frames, and B-frames for the L-channel. Each of these frames that are non-variation containing frames is encoded using a first or primary encryption key. In one embodiment, if one or more left-eye image frames include a variation, the L-channel encoder 114 also generates an I-frame for these frames as well. However, an I-frame that includes a variation is encoded with a second or non-primary encryption key that is different from the first or primary encryption key. I-frames are generated by intra-encoding the left-eye image frame. The L-channel encoder generates P-frames by using forward prediction based on the previously generated I-frame. A P-frame is encoded in relation with the previous image by referring to the previous image. The macroblocks of the current image are encoded using the forward prediction encoding method predicted from the similar macroblocks in the previous I-frame or P-frame. The L-channel encoder utilizes bidirectional prediction to generate a B-frame based on the generated I-frame and P-frame. A B-frame is encoded by referring to the previous image and the subsequent I-frame or P-frame at the same time.

Figure 2:
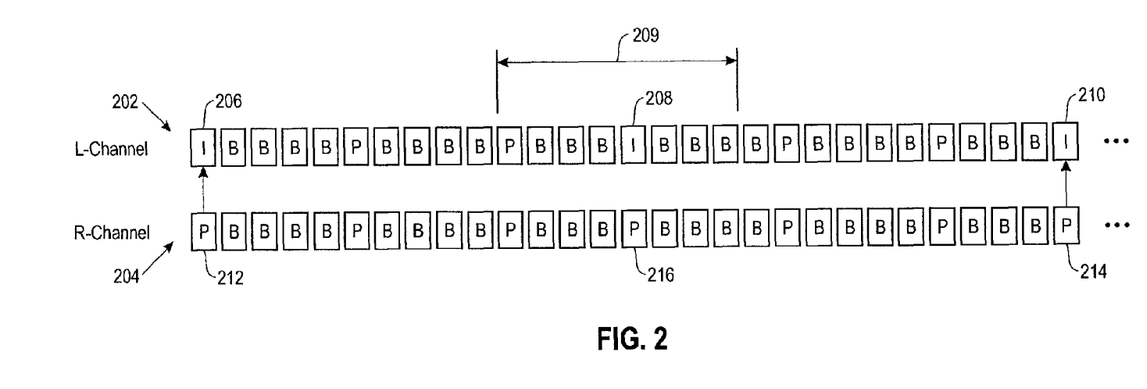
FIG. 2 illustrates one example of encoding multi-channel media content with variations according to one embodiment of the present invention.

With respect to the R-channel, the R-channel encoder 116, in one embodiment, only generates P-frames and B-frames, which are encoded using the first or primary encryption key. For example, FIG. 2 shows one example of an encoded L-channel 202 and corresponding encoded R-channel 204. The L-channel 202 represents a single video track with a variation occurring in the middle I-Frame 208. As can be seen, the R-channel 204 only comprises P-frames and B-frames corresponding to the P-frames and B-frames of the L-channel 202. The R-channel 204 does not comprise any I-frames corresponding to the I-frames of the L-channel 202, but instead includes P-frames 212, 214 that correspond to the I-frames 206, 210 of the L-channel 202. Stated differently, where the R-channel encoder 116 would normally generate an I-frame corresponding to an I-frame in the L-channel 202, a P-frame 212, 214 is generated instead. This P-frame 212, 214 is a delta from its corresponding I-frame 206, 210 in the L-channel 202. In other words, the corresponding P-frame 212, 214 of the R-channel 202 refers to the corresponding I-frame 206, 210 in the L-channel 202 as indicated by the arrows pointing from these P-frames 214, 216 to the corresponding I-frame 206, 210 in the L-channel 202. In this embodiment, during decode time the data for all non-variant I-frames 206, 210 in the L-channel 202 is sent to the R-channel decoder followed immediately (e.g., same rendering time stamp) by the R-channel's corresponding P-frame 212, 214 to generate the R-channel "composite" I-frame.

In the example shown in FIG. 2, the first I-frame 206 and the last I-frame 210 shown in the L-channel 202 are primary-key encrypted I-frames. In other words, the same primary key was used to encrypt these frames as well as the P-frames and B-frames of the L-channel 202 and R-channel 204. Therefore, a single-key decoder of a playback device is able to decrypt/decode these P-frames and B-frames. However, the I-frame 208 in the middle of the L-channel 202 is within variation region 209 and, therefore, is encrypted with a non-primary encryption key. Stated differently, a key other than the primary key was used to encrypt this frame 208. Thus, if the corresponding P-frame 216 of the R-channel 204 were to refer to this I-frame 208, this P-frame 216 could not be decoded and properly played back since the decoder does not have the correct key.

Therefore, in the current embodiment, the R-channel encoder 116 encodes the frame corresponding to the variation I-frame 208 as a P-frame 216 that only refers to the content of the R-channel 204. Stated differently, the variant containing I-frame 208, which is a non-primary-key encrypted I-frame, is not sent to the R-channel 204 unlike the other I-frames 206, 210. Therefore, the R-channel 204 only comprises frames which have been encoded with an encryption key supported by the single-key decoder associated therewith. This allows a single-key decoder to properly decode a frame 216 in the R-channel 204 that has a corresponding frame 208 in the L-channel 202 within a variation region 209.

Figure 3:
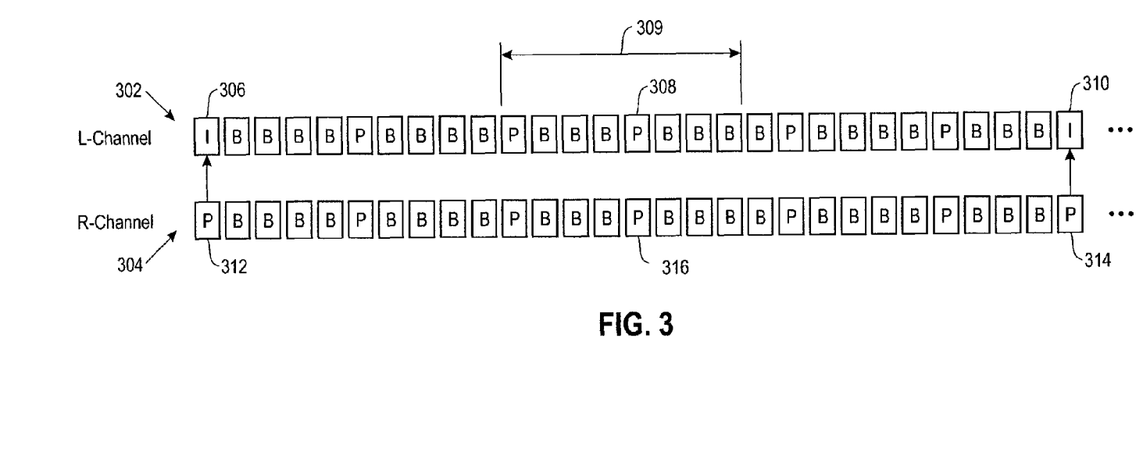
FIG. 3 illustrates another example of encoding multi-channel media content with variations according to one embodiment of the present invention.

In another embodiment, the encoding system 104 does not generate I-frames for the L-channel during a point of variation, but generates P or B frames instead. For example, FIG. 3 shows one example of this encoding process. In this embodiment, the L-channel encoder 114 generates I-frames 306, 310 for a set of non-variant left-eye image frames within the left channel 302, as shown in FIG. 3. However, if a current frame being encoded is within a variation region 309, the L-channel encoder generates a P-frame 308 (or B-frame) for this frame, as compared to an I-frame.

The R-channel encoder 116, in this embodiment, only generates P and B frames similar to the embodiment discussed above with respect to FIG. 2. For example, where the L-channel encoder 114 encodes a given left-eye image frame as an I-frame 306, 310 the R-channel encoder 116 generates a P-frame 312, 314 for the corresponding right-eye image frame. This P-frame 312, 314 is a delta from its corresponding I-frame 306, 310 in the L-channel 302. In other words, the corresponding P-frame 312, 314 of the R-channel 302 refers to the corresponding I-frame 306, 310 in the L-channel 302 as indicated by the arrows shown in FIG. 3. In this embodiment, during decode time the data for all non-variant I-frames 306, 310 in the L-channel 302 is sent to the R-channel decoder followed immediately (e.g., same rendering time stamp) by the R-channel's corresponding P-frame 312, 314 to generate the R-channel "composite" I-frame.

The R-channel encoder 116 encodes the right-eye image frame corresponding to the variation P-frame 308 as a P-frame 316 that only refers to the content of the R-channel 204. In the example of FIG. 3, because the L-channel 302 does not comprise an I-frame for a left-eye image frame comprising a variation, a non-primary key encrypted I-frame is not sent to the R-channel single-key decoder. Therefore, since the R-channel comprises only P-frames and B-frames, the R-channel 304 only comprises frames which have been encoded with an encryption key supported by the single-key decoder associated therewith. This allows a single-key decoder to properly decode a frame 316 in the R-channel 304 that has a corresponding frame 308 in the L-channel 302 comprising variances.

Figure 4:
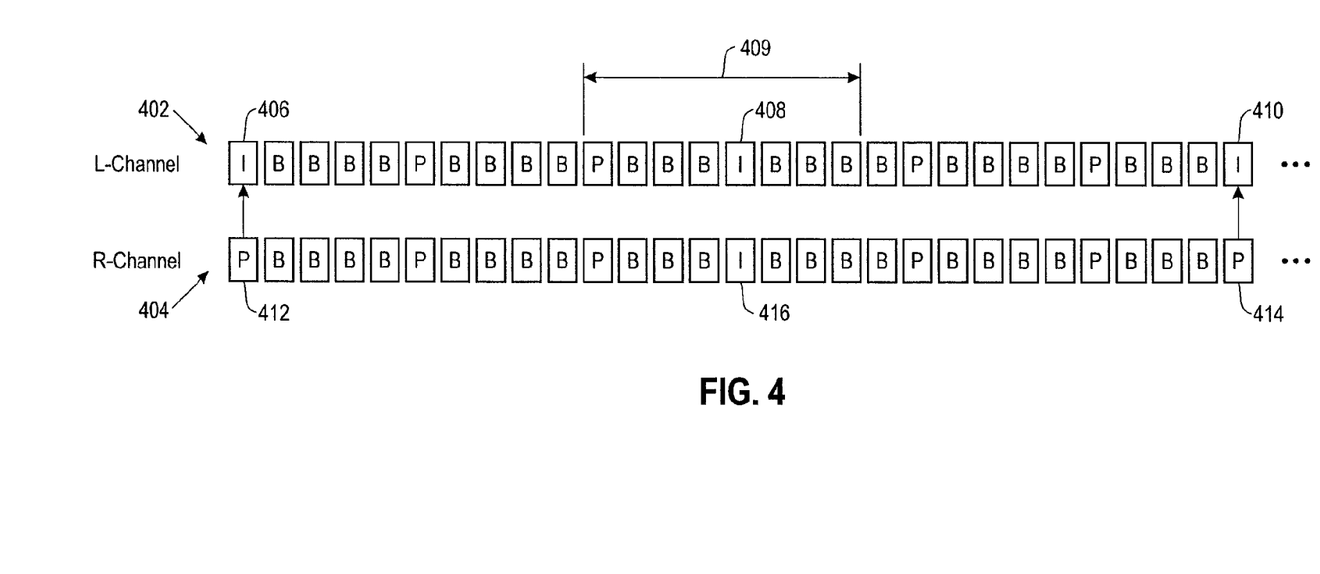
FIG. 4 illustrates yet another example of encoding multi-channel media content with variations according to one embodiment of the present invention.

In a further embodiment, the encoding system 104 generates an I-frame for a left-eye image frame in the L-channel and also generates a corresponding I-frame for a corresponding right-eye image frame in the R-channel. FIG. 4 shows one example of this encoding process. As can be seen, the L-channel encoder 114 encodes the L-channel 402 similar to the embodiment discussed above with respect to FIG. 2. For example, the L-channel encoder 114 generates I-frames 406, 410 for a set of non-variant containing left-eye image frames within the left channel 402, as shown in FIG. 4. If one or more left-eye image frames include a variation, the L-channel encoder 114 also generates an I-frame 408 for these frames as well, as shown in the variation region 409 of FIG. 4.

As discussed above, non-variant containing I-frames 406, 410 are encrypted with a primary key while I-frames 408 comprising variations are encrypted with non-primary encryption keys. The L-channel encoder 114 also generates P and B frames in between the I-frames 406, 408, 410 that are encrypted with the primary key as well. In this embodiment, the R-channel encoder 116 generates P and B frames, similar to the embodiments discussed above with respect to FIGS. 2 and 3, for right-eye image frames that correspond to non-variant containing left-eye image frames. For example, for each right-eye image frame corresponding to a left-eye image frame encoded as a non-variation I-frame, the R-channel encoder 116 generates a P-frame 412, 414 that refers to the corresponding left-eye image frame in the L-channel 402, as shown by the arrows. Therefore, during decode time the data for all non-variant I-frames 406, 410 in the L-channel 402 is sent to the R-channel decoder followed immediately (e.g., same rendering time stamp) by the R-channel's corresponding P-frame 412, 414 to generate the R-channel "composite" I-frame.

However, if a corresponding left-eye image frame includes variances the R-channel encoder 116 generates a corresponding an I-frame 416 for the corresponding right-eye image frame. In this embodiment, the I-frame 416 generated by the R-channel encoder 116 does not include any variances and is encoded with the encryption key supported by the single-key decoder associated with the R-channel 404. Therefore, because the R-channel 404 comprises its own I-frame 416 corresponding to an I-frame 408 in the L-channel 302 comprising variations, the non-primary key encrypted I-frame of the L-channel 402 does not need to be sent to the R-channel decoder. Also, because all of the frames in the R-channel 404 are encoded with the key (e.g., primary key) supported by the single-key decoder a frame 416 in the R-channel 304 that has a corresponding frame 408 in the L-channel 402 comprising variances can be properly decoded by the single-key decoder.

In FIG. 4, an I-frame is introduced in the R-channel 404, which creates a larger R-channel 404, i.e. more data, since it has replaced a P-frame by an I-frame. The embodiment discussed above with respect to FIG. 2 removes the dependency on the L-channel within a variation region, and instead the P-frame has dependencies to the other P-frames in the R-channel that also have no dependencies on the L-channel. This embodiment is advantageous, for example, where decoders/encoders cannot handle dependencies between R-channel and L-channel. The embodiment discussed above with respect to FIG. 3 removes the creation of I-frames with variations, where the changes are done to the information in the L-channel and the handling of the R-channel is unperturbed or unchanged.

It should be noted that the encoding system 104 can utilize each of the various embodiments discussed above with respect to FIGS. 2-4 on the content 106. For example, the encoding system 104 can switch encoding mechanisms at any point on the stream, as many times as desired. The rate controller of an encoder/decoder can evaluate if a certain strategy is better for certain segments of the video depending on the quality of the image, and consequently have a content driven switching.

Figure 5:
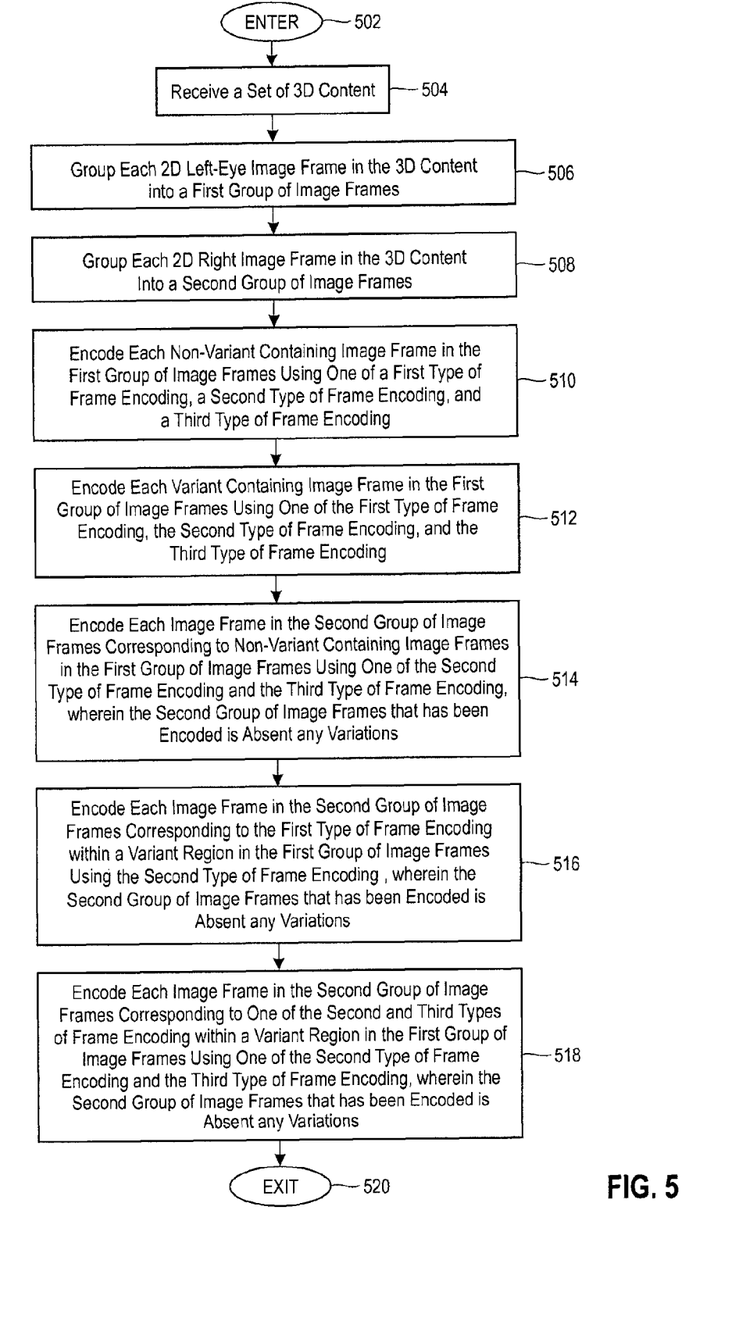
FIGS. 5-8 are operational flow diagrams illustrating various examples of encoding multi-channel media content with variations according to various embodiments of the present invention.
Figure 6:
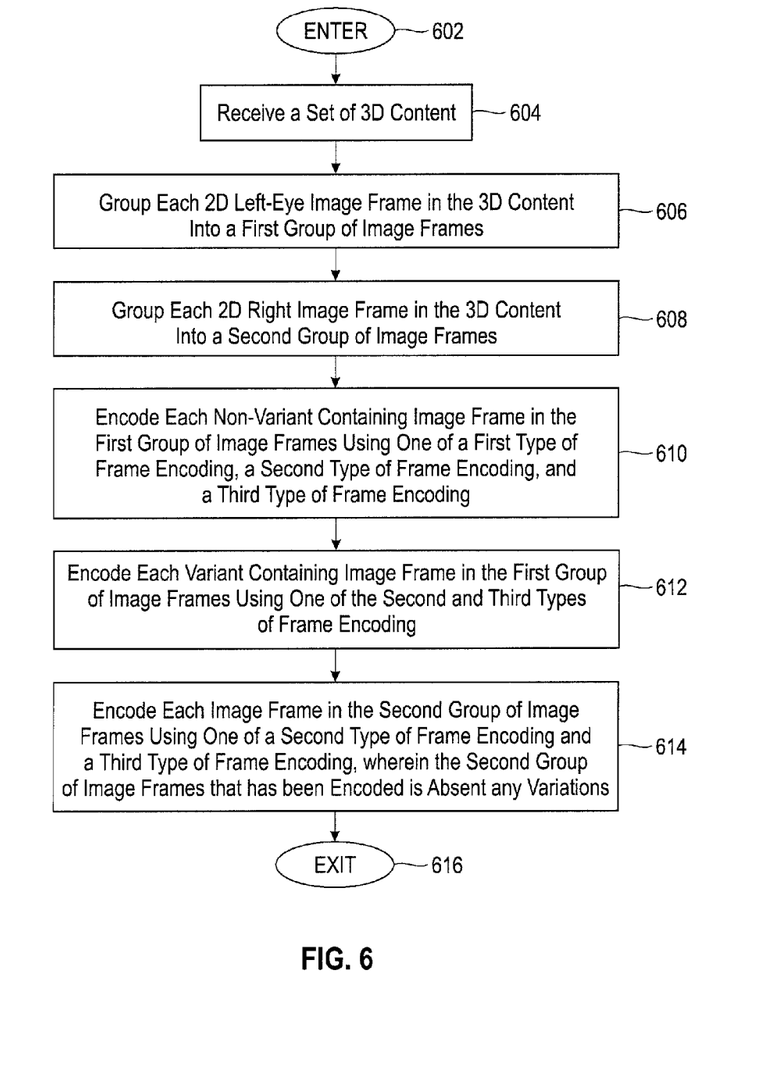
Figure 7:
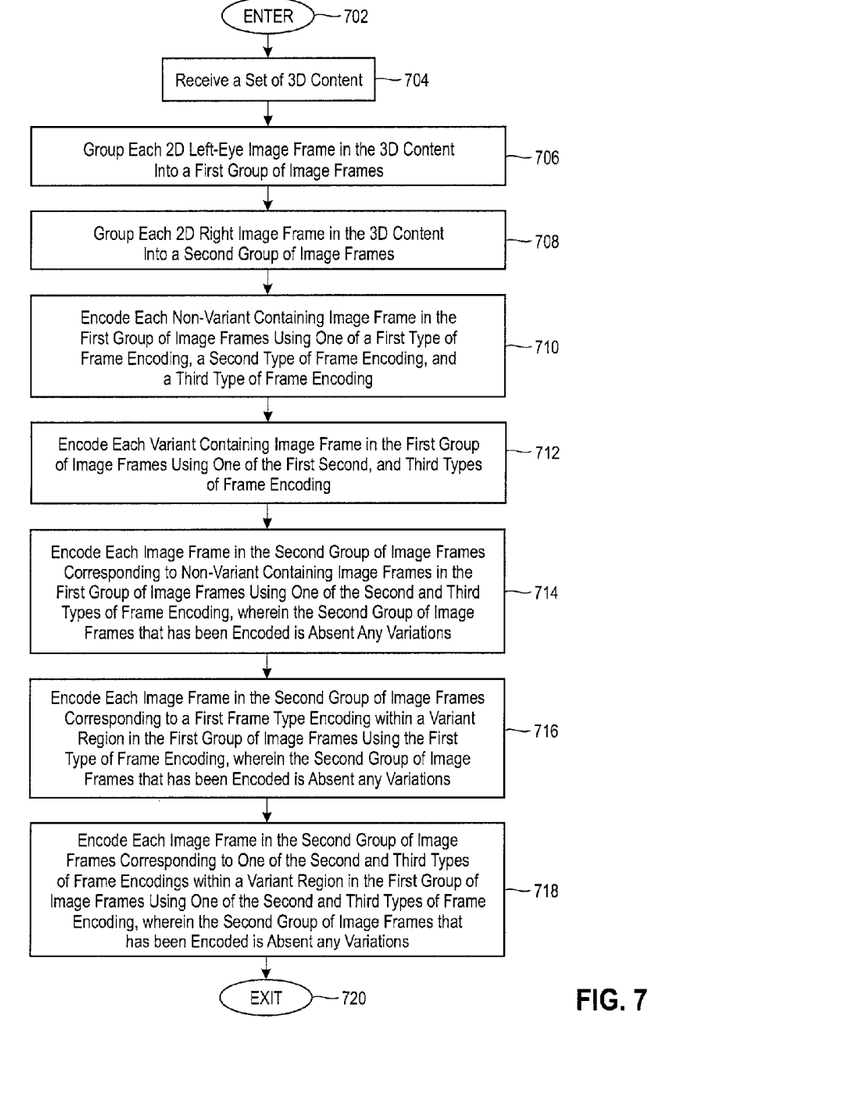

Referring now to FIGS. 5-7, the flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 5 is an operational flow diagram illustrating one example of encoding 3D content with variations. It should be noted that a more detailed discussion with respect to this process has already been given above with respect to FIG. 2. The operational flow of FIG. 5 starts at step 502 and flows directly into step 504. The encoding system 104, at step 504, receives a set of 3D content 106. The encoding system 104, at step 506, groups each 2D left-eye image frame in the 3D content 106 into a first group of image frames. The encoding system 104, at step 508, groups each right-eye image frame in the 3D content 106 into a second group of image frames.

The encoding system 104, at step 510, encodes each non-variant containing image frame in the first group of image frames using one of a first type of frame encoding, a second type of frame encoding, and a third type of frame encoding. The encoding system 104, at step 512, encodes each variant containing image frame in the first group of image frames using one of the first type of frame encoding, the second type of frame encoding, and the third type of frame encoding. The encoding system 104, at step 514, encodes each image frame in the second group of image frames corresponding to non-variant containing image frames in the first group of image frames using one of the second type of frame encoding and the third type of frame encoding. The second group of image frames that has been encoded is absent any variations.

The encoding system 104, at step 516 encodes each image frame in the second group of image frames corresponding to the first type of frame encoding within a variant region in the first group of image frames using one of the second type of frame encoding and the third type of frame encoding. The second group of image frames that has been encoded is absent any variations. The encoding system 104, at step 516, encodes each image frame in the second group of image frames corresponding to one of the second and third types of frame encoding within a variant region in the first group of image frames using one of the second type of frame encoding and the third type of frame encoding. The second group of image frames that has been encoded is absent any variations.

The encoding system 104, at step 512, encodes each variant containing image frame in the first group of image frames using the first type of frame encoding. The encoding system 104, at step 514, encodes each image frame in the second group of image frames using one of the second type of frame encoding and the third type of frame encoding. The second group of image frames that has been encoded does not comprise any variations. The control flow then exits at step 516.

FIG. 6 is an operational flow diagram illustrating another example of encoding 3D content with variations. It should be noted that a more detailed discussion with respect to this process has already been given above with respect to FIG. 3. The operational flow of FIG. 6 starts at step 602 and flows directly into step 604. The encoding system 104, at step 604, receives a set of 3D content 106. The encoding system 104, at step 606, groups each 2D left-eye image frame in the 3D content 106 into a first group of image frames. The encoding system 104, at step 608, groups each right-eye image frame in the 3D content 106 into a second group of image frames.

The encoding system 104, at step 610, encodes each non-variant containing image frame in the first group of image frames using one of a first type of frame encoding, a second type of frame encoding, and a third type of frame encoding. The encoding system 104, at step 612, encodes each variant containing image frame in the first group of image frames using one of the second and third types of frame encoding.

The encoding system 104, at step 614, encodes each image frame in the second group of image frames using one of the second type of frame encoding and the third type of frame encoding. The second group of image frames that has been encoded does not comprise any variations. The control flow then exits at step 616.

FIG. 7 is an operational flow diagram illustrating yet another example of encoding 3D content with variations. It should be noted that a more detailed discussion with respect to this process has already been given above with respect to FIG. 4. The operational flow of FIG. 7 starts at step 702 and flows directly into step 704. The encoding system 104, at step 704, receives a set of 3D content 106. The encoding system 104, at step 706, groups each 2D left-eye image frame in the 3D content 106 into a first group of image frames. The encoding system 104, at step 708, groups each right-eye image frame in the 3D content 106 into a second group of image frames.

The encoding system 104, at step 710, encodes each non-variant containing image frame in the first group of image frames using one of a first type of frame encoding, a second type of frame encoding, and a third type of frame encoding. The encoding system 104, at step 712, encodes each variant containing image frame in the first group of image frames using one of the first, second, and third types of frame encoding. The encoding system 104, at step 714, encodes each image frame in the second group of image frames that correspond to non-variant containing image frames in the first group of image frames using one of the second type of frame encoding and the third type of frame encoding.

The encoding system 104, at step 716, encodes each image frame in the second group of image frames that correspond to a first frame type encoding within a variant region in the first group of image frames using the second type of frame encoding. The second group of image frames that has been encoded does not comprise any variations. The encoding system 104, at step 718, encodes each image frame in the second group of image frames corresponding to one of the second and third types of frame encodings within a variant region in the first group of image frames using one of the second and third types of frame encoding. The second group of image frames that has been encoded is absent any variations. The control flow then exits at step 720.

Figure 8:
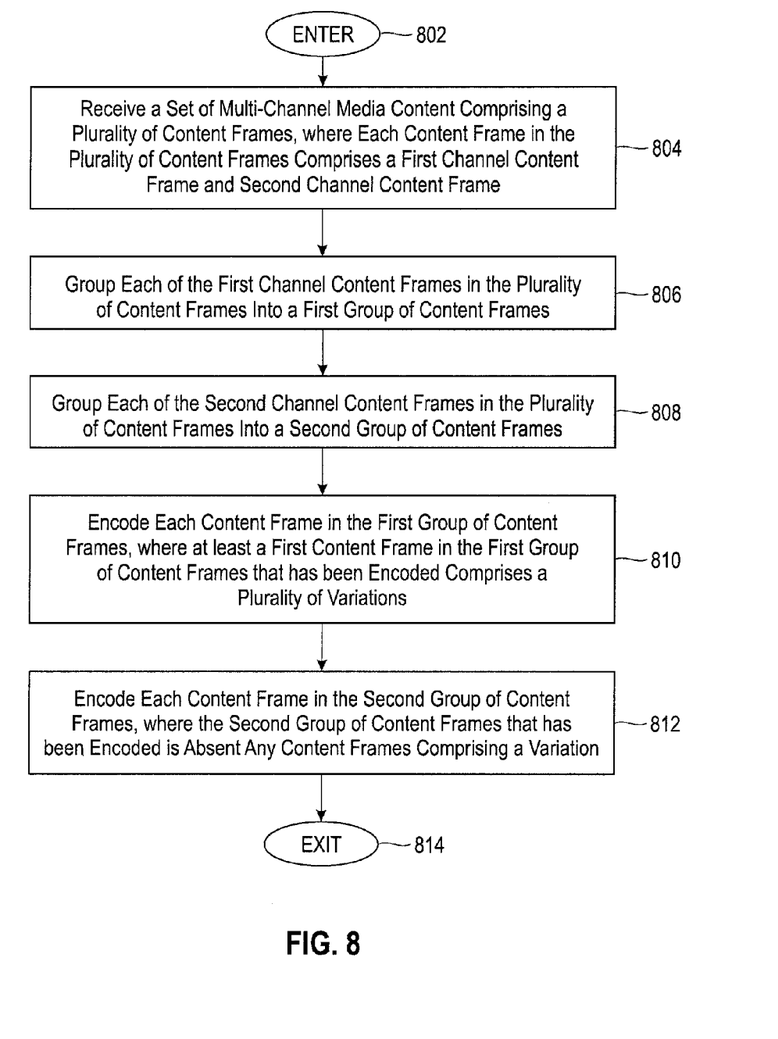

FIG. 8 is an operational flow diagram illustrating an example of an overall process for encoding multi-channel media content with variations. The operational flow of FIG. 8 starts at step 802 and flows directly into step 804. The encoding system 104, at step 804, receives a set of multi-channel media content comprising a plurality of content frames. Each content frame in the plurality of content frames comprises a first channel content frame and second channel content frame. The encoding system 104, at step 806, groups each of the first channel content frames in the plurality of content frames into a first group of content frames.

The encoding system 104, at step 808, groups each of the second channel content frames in the plurality of content frames into a second group of content frames. The encoding system 104, at step 810, encodes each content frame in the first group of content frames. At least a first content frame in the first group of content frames that has been encoded comprises a plurality of variations. Each variation in the plurality of variations is a different version of the first content frame. The encoding system 104, at step 812, encodes each content frame in the second group of content frames. The second group of content frames that has been encoded is absent any content frames comprising a variation. The control flow exits at step 814.

Figure 9:
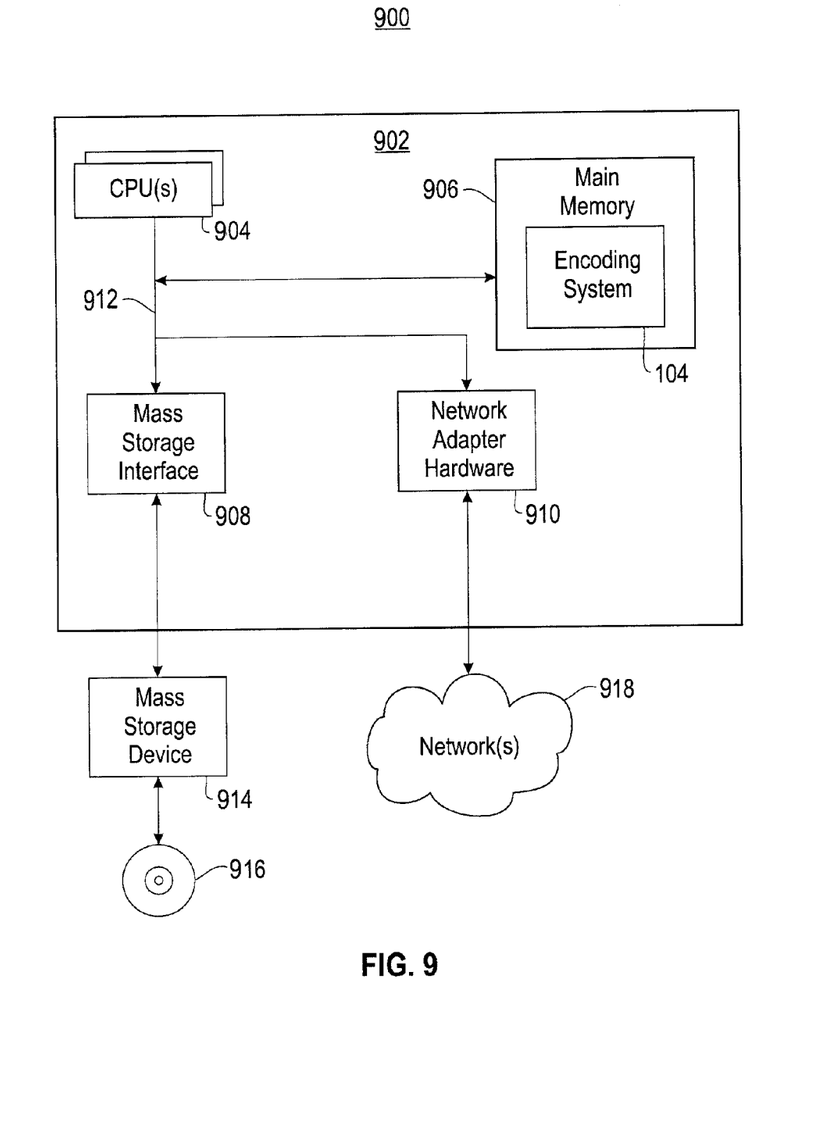
FIG. 9 is a block diagram illustrating a detailed view of an information processing system according to one embodiment of the present invention.

Referring now to FIG. 9, this figure is a block diagram illustrating an information processing system that can be utilized in embodiments of the present invention. The information processing system 900 is based upon a suitably configured processing system configured to implement one or more embodiments of the present invention (e.g., the information processing system 102 of FIG. 1). Any suitably configured processing system can be used as the information processing system 900 in embodiments of the present invention.

The information processing system 900 includes a computer 902. The computer 902 has a processor(s) 904 that is connected to a main memory 906, mass storage interface 909, and network adapter hardware 910. A system bus 912 interconnects these system components. Although only one CPU 904 is illustrated for computer 902, computer systems with multiple CPUs can be used equally effectively. The main memory 906, in this embodiment, comprises the encoding system 104 and its components.

The mass storage interface 908 is used to connect mass storage devices, such as mass storage device 914, to the information processing system 900. One specific type of data storage device is an optical drive such as a CD/DVD drive, which can be used to store data to and read data from a computer readable medium or storage product such as (but not limited to) a CD/DVD 916. Another type of data storage device is a data storage device configured to support, for example, NTFS type file system operations.

An operating system included in the main memory is a suitable multitasking operating system. Embodiments of the present invention are also able to use any other suitable operating system. Some embodiments of the present invention utilize architectures, such as an object oriented framework mechanism, that allows instructions of the components of operating system to be executed on any processor located within the information processing system 900. The network adapter hardware 910 is used to provide an interface to a network 918. Embodiments of the present invention are able to be adapted to work with any data communications connections including present day analog and/or digital techniques or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method, comprising:

receiving a set of multi-channel media content comprising a plurality of content frames, wherein each content frame in the plurality of content frames comprises a first channel content frame and second channel content frame;

grouping each of the first channel content frames in the plurality of content frames into a first group of content frames;

grouping each of the second channel content frames in the plurality of content frames into a second group of content frames, where the second group of content frames is separate from the first group of content frames;

encoding each content frame in the first group of content frames, wherein each of a set of content frames in the first group of content frames that has been encoded comprises at least one variation, wherein each of the variations is a different version of a given section of the multi-channel media content;

encoding each content frame in the second group of content frames, wherein the second group of content frames that has been encoded is absent any content frames comprising a variation;

encrypting each of the set of content frames with a separate and different encryption key that is also separate and different from an encryption key used to encrypt content frames in the first group of content frames that are absent a variation, the encrypting configuring each of the set of content frames to be decoded by a multi-key decoder of a playback device; and encrypting each content frame in the second group of content frames with an encryption key used to encrypt the content frames in the first group of content frames that are absent a variation, the encrypting configuring each content frame in the second group of content frames to be decoded by a single-key decoder of the playback device.

2. The method of claim 1, wherein encoding each content frame in the first group of content frames comprises:

encoding each content frame in the first group of content frames using one of a first type of frame encoding, a second type of frame encoding, and a third type of frame encoding; and wherein encoding each content frame in the second group of content frames comprises:

encoding each content frame in the second group of content frames using one of the second type of frame encoding and the third type of frame encoding.

3. The method of claim 2, wherein at least one content frame in the first group of content frames is absent any variations, wherein the at least one content frame comprises a corresponding content frame in the second group of content frames that has been encoded using one of the second type of frame encoding and third type of frame encoding, wherein the corresponding content frame from the second group of content frames refers to the second content frame from the first group of content frames.

4. The method of claim 2, wherein each of the set of content frames in the first group of content frames is encoded using the first type of frame encoding, wherein a set of content frames from the second group of content frames that has been encoded using one of the second type of frame encoding and the third type of frame encoding corresponds to the set of content frames in the first group of content frames, and wherein each of the set of content frames from the second group of content frames refers to another set of content frames within the second group of content frames.

5. The method of claim 2, wherein each of the set of content frames in the first group of content frames is encoded using one of the second type of frame encoding and the third type of frame encoding, and wherein each of the set of content frames in the second group of content frames is encoded using one of the second type of frame encoding and the third of frame encoding, wherein each of the set of content frames in the first group of content frames comprises a corresponding content frame in the second group of content frames, and wherein the corresponding content frame refers to another frame within the second group of content frames.

6. The method of claim 2, wherein the first type of frame encoding is an I-frame, the second type of frame encoding is a P-frame, and the third type of frame encoding a B-frame.

7. The method of claim 1, wherein each of the set of content frames in the first group of content frames is encoded using a first type of frame encoding, and wherein each of a set of content frames from the second group of content frames corresponding to the set of content frames in the first group of content frames is encoded using the first type of frame encoding.

8. The method of claim 1, wherein the set of multi-channel media content is a three-dimensional (3D) image comprising a plurality of image frames, wherein the plurality of content frames is a plurality of image frames, wherein the first channel content frame is a two-dimensional (2D) left-eye image, and wherein the second channel content frame is a 2D right-eye image frame.

9. The method of claim 1, wherein the set of multi-channel media content is a set of multi-channel audio content.

10. The method of claim 1, wherein the content frames in the first group of content frames that are absent a variation are decodable by a single-key comprised in a playback device.

11. A system, comprising:
a memory;
a processor communicatively coupled to the memory; and
an encoding system communicatively coupled to the memory and the processor, wherein the encoding system is configured to perform a method comprising:

receiving a set of multi-channel media content comprising a plurality of content frames, wherein each content frame in the plurality of content frames comprises a first channel content frame and second channel content frame;

grouping each of the first channel content frames in the plurality of content frames into a first group of content frames;

grouping each of the second channel content frames in the plurality of content frames into a second group of content frames, where the second group of content frames is separate from the first group of content frames;

encoding each content frame in the first group of content frames, wherein each of a set of content frames in the first group of content frames that has been encoded comprises at least one variation, wherein each of the variations is a different version of a given section of the multi-channel media content;

encoding each content frame in the second group of content frames, wherein the second group of content frames that has been encoded is absent any content frames comprising a variation;

encrypting each of the set of content frames with a separate and different encryption key that is also separate and different from an encryption key used to encrypt content frames in the first group of content frames that are absent a variation, the encrypting configuring each of the set of content frames to be decoded by a multi-key decoder of a playback device; and encrypting each content frame in the second group of content frames with an encryption key used to encrypt the content frames in the first group of content frames that are absent a variation, the encrypting configuring each content frame in the second group of content frames to be decoded by a single-key decoder of the playback device.

12. The system of claim 11, wherein encoding each content frame in the first group of content frames comprises:

encoding each content frame in the first group of content frames using one of a first type of frame encoding, a second type of frame encoding, and a third type of frame encoding; and wherein encoding each content frame in the second group of content frames comprises:

encoding each content frame in the second group of content frames using one of the second type of frame encoding and the third type of frame encoding.

13. The system of claim 12, wherein at least one content frame in the first group of content frames is absent any variations, wherein the at least one content frame comprises a corresponding content frame in the second group of content frames that has been encoded using one of the second type of frame encoding and third type of frame encoding, wherein the corresponding content frame from the second group of content frames refers to the second content frame from the first group of content frames.

14. The system of claim 12, wherein each of the set of content frames in the first group of content frames is encoded using the first type of frame encoding, wherein a set of content frames from the second group of content frames that has been encoded using one of the second type of frame encoding and the third type of frame encoding corresponds to the set of content frames in the first group of content frames, and wherein each of the set of content frames from the second group of content frames refers to another set of content frames within the second group of content frames.

15. The system of claim 12, wherein each of the set of content frames in the first group of content frames is encoded using one of the second type of frame encoding and the third type of frame encoding, and wherein each of the set of content frames in the second group of content frames is encoded using one of the second type of frame encoding and the third of frame encoding,
  wherein each of the set of content frames in the first group of content frames comprises a corresponding content frame in the second group of content frames, and wherein the corresponding content frame refers to another frame within the second group of content frames.

16. The system of claim 11, wherein each of the set of content frames in the first group of content frames is encoded using a first type of frame encoding, and wherein each of a set of content frames from the second group of content frames corresponding to the set of content frames in the first group of content frames is encoded using the first type of frame encoding.

17. A computer program product, the computer program product comprising a non-transitory computer readable storage medium having program code embodied therewith, the program code readable/executable by a processor to perform a method comprising:
  receiving a set of multi-channel media content comprising a plurality of content frames, wherein each content frame in the plurality of content frames comprises a first channel content frame and second channel content frame;
  grouping each of the first channel content frames in the plurality of content frames into a first group of content frames;
  grouping each of the second channel content frames in the plurality of content frames into a second group of content frames, where the second group of content frames is separate from the first group of content frames;
  encoding each content frame in the first group of content frames, wherein each of a set of content frames in the first group of content frames that has been encoded comprises at least one variation, wherein each of the variations is a different version of a given section of the multi-channel media content;
  encoding each content frame in the second group of content frames, wherein the second group of content frames that has been encoded is absent any content frames comprising a variation;
  encrypting each of the set of content frames with a separate and different encryption key that is also separate and different from an encryption key used to encrypt content frames in the first group of content frames that are absent a variation, the encrypting configuring each of the set of content frames to be decoded by a multi-key decoder of a playback device; and
  encrypting each content frame in the second group of content frames with an encryption key used to encrypt the content frames in the first group of content frames that are absent a variation, the encrypting configuring each content frame in the second group of content frames to be decoded by a single-key decoder of the playback device.

18. The computer program product of claim 17, wherein encoding each content frame in the first group of content frames comprises:
  encoding each content frame in the first group of content frames using one of a first type of frame encoding, a second type of frame encoding, and a third type of frame encoding; and
  wherein encoding each content frame in the second group of content frames comprises:
    encoding each content frame in the second group of content frames using one of the second type of frame encoding and the third type of frame encoding.

19. The computer program product of claim 18, wherein at least one content frame in the first group of content frames is absent any variations, wherein the at least one content frame comprises a corresponding content frame in the second group of content frames that has been encoded using one of the second type of frame encoding and third type of frame encoding, wherein the corresponding content frame from the second group of content frames refers to the second content frame from the first group of content frames.

20. The computer program product of claim 18, wherein each of the set of content frames in the first group of content frames is encoded using the first type of frame encoding, wherein a set of content frames from the second group of content frames that has been encoded using one of the second type of frame encoding and the third type of frame encoding corresponds to the set of content frames in the first group of content frames, and wherein each of the set of content frames from the second group of content frames refers to another set of content frames within the second group of content frames.

21. The computer program product of claim 18, wherein each of the set of content frames in the first group of content frames is encoded using one of the second type of frame encoding and the third type of frame encoding, and wherein each of the set of content frames in the second group of content frames is encoded using one of the second type of frame encoding and the third of frame encoding,
  wherein each of the set of content frames in the first group of content frames comprises a corresponding content frame in the second group of content frames, and wherein the corresponding content frame refers to another frame within the second group of content frames.

22. The computer program product of claim 18, wherein the first type of frame encoding is an I-frame, the second type of frame encoding is a P-frame, and the third type of frame encoding a B-frame.

23. The computer program product of claim 17, herein each of the set of content frames in the first group of content frames is encoded using a first type of frame encoding, and wherein each of a set of content frames from the second group of content frames corresponding to the set of content frames in the first group of content frames is encoded using the first type of frame encoding.

* * * * *